United States Patent [19]

Cielo et al.

[11] 4,162,502
[45] Jul. 24, 1979

[54] PRINTER WITH ELECTROSTATIC INK CONTROL

[75] Inventors: Paolo Cielo; William D. Westwood, both of Ottawa, Canada

[73] Assignee: Northern Telecom Limited, Montreal, Canada

[21] Appl. No.: 903,187

[22] Filed: May 5, 1978

[51] Int. Cl.² ............................................. G01D 15/18
[52] U.S. Cl. ........................ 346/140 R; 101/DIG. 13
[58] Field of Search ................... 346/140 R, 1; 101/1, 101/DIG. 13

[56] References Cited

U.S. PATENT DOCUMENTS

| 3,375,528 | 3/1968 | Klavsons et al. | 346/140 R |
| 3,693,179 | 9/1972 | Skala | 346/140 R X |
| 3,750,564 | 8/1973 | Bettin | 346/140 R X |

Primary Examiner—George H. Miller, Jr.
Attorney, Agent, or Firm—Sidney T. Jelly

[57] ABSTRACT

A liquid ink printer uses electrostatic control of ink flow along paths defined by strips of hydrophilic material. The strips may be discontinuous, with a narrow gap across which ink is urged to flow by application of a voltage to an electrode, or a gate member may be pulled down onto a strip to prevent ink flow. In a further arrangement drops of ink are extracted from the ends of the strips and accelerated towards a printing position by an electrode pattern.

10 Claims, 7 Drawing Figures

U.S. Patent    Jul. 24, 1979    4,162,502
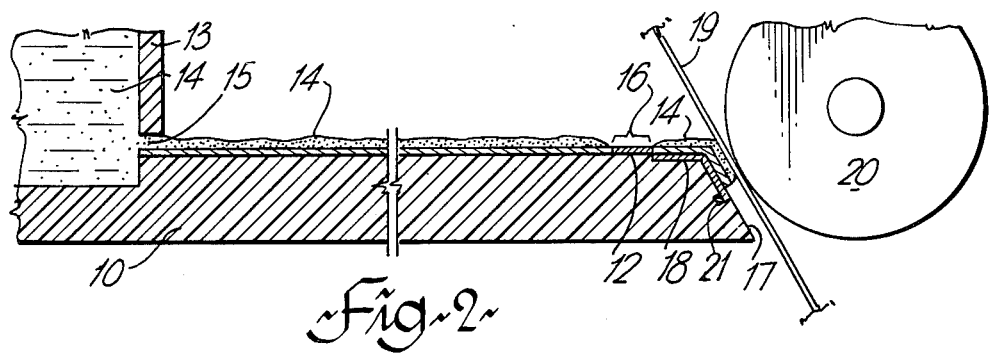
Fig-2
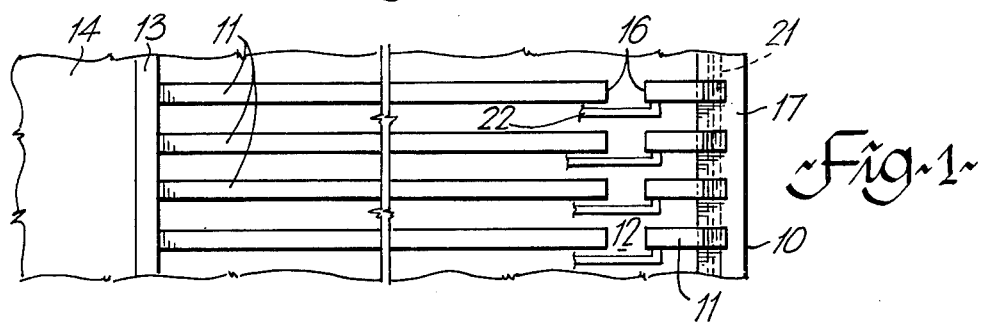
Fig-1
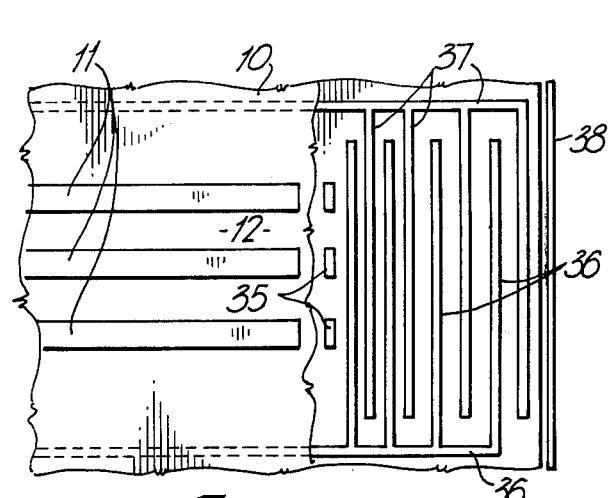
Fig-7
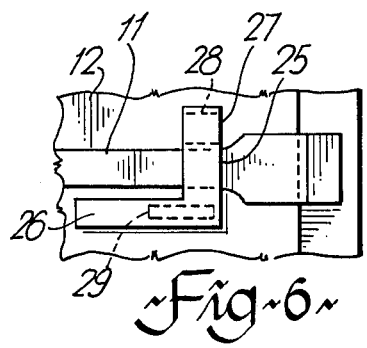
Fig-6
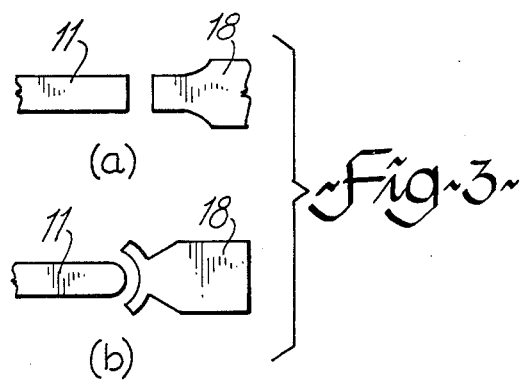
Fig-5
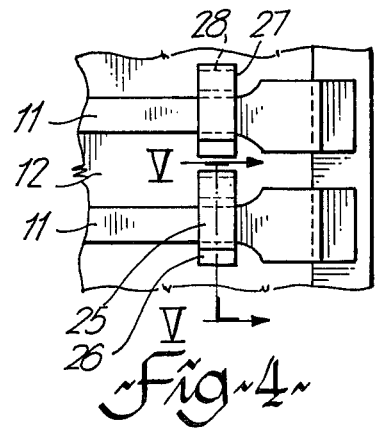
Fig-3
Fig-4

PRINTER WITH ELECTROSTATIC INK CONTROL

This invention relates to a printer with electrostatic ink control and particularly to a printer in which is caused to flow along a surface to a printing position, the flow of the ink being along hydrophilic material paths and controlled electrostatically.

Various techniques exist for facsimile and other printing, such as impact, thermal and ink ejection.

Impact techniques require the mechanical displacement of a hammer which transfers ink from a ribbon to the paper to record the desired information. The main problems of these techniques are limited life and reliability of moving parts, noise, low speed, light power consumption and cost. With the present invention, there are no moving parts for the printing head and high speed, low noise and noise and improved power consumption are obtained.

Thermal printing consists in localized heating of a pre-coated heat sensitive paper. Heat is usually supplied by an electric current through thin or thick-film resistors in contact with paper. With the present invention there is no need for precoated paper. Moreover, inks of different colours can be handled.

Ink jet printing comprises the ejection from an ink reservoir and subsequent deflection of ink droplets. The undeflected drops strike a paper sheet and form the desired pattern. Most droplets are however deflected to a gutter from which ink is returned to the reservoir through a recirculating and filtering system. This technique is bulky and complex owing to the hydraulic recirculating system, and hardly reliable because of the presence of high pressure ink containers and ink fog generated at the impact of ink with paper. With the present invention there is no continuous ink-jet, so that the recirculation system is not required and there is no high pressure impact of ink with paper. The system is more compact, and the production of ink fog is avoided.

In the present invention, ink flows along predetermined paths, defined by hydrophilic material, with spacers of hydrophobic material between succeeding portions of the hydrophilic material. The progression of the ink along the paths is controlled electrostatically.

The invention will be readily understood by the following description in conjunction with the accompanying drawings, in which:

FIG. 1 is a plan view of one arrangement of ink paths;
FIG. 2 is a cross-section on the line II—II of FIG. 1;
FIGS. 3a and 3b illustrate two alternative forms of electrodes for use in the arrangement of FIG. 1;
FIG. 4 is a plan view of an alternative arrangement;
FIG. 5 is a cross-section on the line V—V of FIG. 4;
FIG. 6 is a plan view of a modification of FIG. 4;
FIG. 7 is a plan view of yet a further arrangement.

As illustrated in FIGS. 1 and 2 on a substrate 10 are formed hydrophilic strips 11, the spaces between being covered with a hydrophobic material at 12. A reservoir 13 supplies ink 14 which flows through a lateral orifice, or a series of orifices, 15. The strips 11 have a gap 16 near the end remote from the reservoir, this gap also filled with hydrophobic material 12. The strips 11 extend part way down the end face 17 of the substrate and an electrode 18 is formed under the ends of the strips 11. A paper sheet 19 is passed in close relationship to the strips 11, backed by a roller 20. The ink 14 feeds along the hydrophilic strip 11 to the gaps 16. When a voltage is applied to an electrode 18, the ink is urged across a gap 16 on to the end of a strip 11 and down the front face into contact with the paper. The paper and roller are omitted from FIG. 1 for clarity. In FIG. 2, ink is shown along the strip 11 to the gap 16 and also some ink is shown on the strip end, having passed over the material 12 in the gap 16 when a pulse was applied to the electrode 18. Any pattern can be printed, spot-by-spot, and the spacing between electrodes 18 can be of the order of 200 $\mu$m for good resolution. The electrodes 18 are activated by conductors, which can comprise a common "ground" conductor 21 and separate conductors 22 formed on the substrate and extending to a contact position.

FIGS. 3a and 3b illustrate alternative electrode 18 and covering strip 11 designs.

In FIG. 3a, the width of the electrode 18 and strip 11 increases, the maximum width corresponding to the portion in contact with the paper. This increases the speed of the ink drop transfer to the paper, as surface tension causes ink to flow from the narrower to the wider regions of a strip. When an ink drop is attracted on the tapered section of the electrode, it quickly moves spontaneously toward the wider section, in contact with paper. In FIG. 3 the end of the electrode 18 and the facing end of the strip 11 is modified to provide a more uniform and efficient electrostatic attraction of the ink drop to the electrode.

A slightly different configuration is shown in FIGS. 4 and 5. Each strip 11 continues without interruption until the end is in contact for the paper 19. A lifting gate 25, made for example of thin Teflon (T.M.) sheet metallized on the top, lies over the strip 11, fastened to the substrate at one end 26, and only floating on it at the other end 27. Opposed to the floating end 27 of the gate 25, an electrode 28 is deposited underneath the hydrophobic coating 12. When no voltage is applied, the ink surface tension makes the gate lift slightly so that some ink can leak under the gate and reach the paper. When a voltage is applied between the electrode 28 and the metallized gate 25, the gate is clamped against the strip 11 and the ink flow is stopped. An advantage of this configuration is related to the small distance between gate and electrode, so that a small voltage is required to attract the gate and control the ink flow. Even more efficient, in this respect, is the alternative gate design shown in FIG. 6. In this design the gate 25 is L-shaped and extends down one side of the strip 11 as well as over the strip. A further electrode 29 is formed, under the hydrophobic coating 12 and the gate is attached at one end of the leg extending down one side of the strip.

FIG. 7 illustrates a further arrangement in which ink drops are extracted from hydrophillic strips by an independently driven extracting electrode formed beneath the hydrophobic coating or layer and passed to a series of accelerating electrodes also formed under the hydrophobic coating. Thus, considering FIG. 7, the series of strips 11 end at an intermediate position on the substrate. Spaced a short distance from the ends of the strips 11 are extracting electrodes 35. The hydrophobic coating 12 is shown removed for the right hand part of the substrate so as to show the electrodes more clearly.

Extending laterally are a series of interlaced accelerating electrodes 36 and 37. In the example two interlaced electrodes are shown but more than this number can be provided. An ink drop is extracted from a strip 11 by a voltage applied to the related extracting electrode 35. The drop acquires an electrostatic change by induction. When the drop lies on the hydrophobic layer or coating 12 above the electrode 35, it can move free from adhesion forces and is displaced toward the paper 38 by the series of accelerating electrodes 36, 37 deposited under the hydrophobic layer 12. In FIG. 7, two interlaced electrodes are continuously driven by a single AC source which is common to all the elements of the linear array. An array of only three strips 11 has been illustrated for clarity. Eventually, the distance between the electrodes can be increased from left to right, proportionally to the velocity gradually acquired by the ink drop. The drops finally hit the paper 38, which can be held in contact with the end of the surface or at a certain distance from it, and which is moved in a direction perpendicular to the plane of FIG. 7 in order to collect the subsequent drop lines.

If the distance between the electrodes is smaller than the drop diameter, a drop will be extracted by the cooperative subsequent attraction by different electrodes, resulting in a lower voltage required by each electrode. Care must be taken in the design to avoid backwards attraction by another electrode. If necessary, a 3-phase driving system may be used.

What is claimed is:

1. A printer with electrostatic ink control, comprising:
    a substrate including an ink reservoir at one end and a printing position at the other end;
    a plurality of strips of hydrophilic material extending side by side on said substrate from said reservoir towards said printing position;
    at least one orifice in a wall of said reservoir for the supply of ink to said strips;
    electrostatic means associated with each strip for controlling the flow of ink along said strip to said printing position.

2. A printer as claimed in claim 1, said strips extending to, and having an end at, an intermediate position between said reservoir and said printing position; an extracting electrode positioned adjacent to said end of each strip, and at least one accelerating electrode between said extracting electrode and said printing position; and means for applying a voltage to said extracting electrode and said accelerating electrode whereby an ink drop is extracted from said end of said strip on to said accelerating electrode for movement to said printing position.

3. A printer as claimed in claims, 1, 5, 6 or 2, including a continuous orifice extending for all of said strips.

4. A printer as claimed in claim 1, including a layer of hydrophobic material on said substrate between said strips.

5. A printer as claimed in claim 1, each of said strips comprising a first portion extending from said orifice and a second portion extending from said printing position, said portions having ends in opposition to define a narrow gap; an electrode under said second portion; and means for applying a voltage to said electrode whereby ink on said first portion of a strip is urged across said gap to said second portion to flow to said printing position.

6. A printer as claimed in claim 1, said strips each continuous from said orifice to said printing position; a gate member extending across each of said strips at an intermediate position; an electrode associated with each strip and means for applying a voltage to said electrode, whereby on application of said voltage said gate member is biased down into contact with said strip to prevent flow of ink along the strip.

7. A printer as claimed in claim 5 or 6, said substrate including an end face at said printing position, said strips extending down said end face, and means for supporting a paper sheet for movement over said end face for reception of ink thereon.

8. A printer as claimed in claim 5, including a layer of hydrophobic material on said substrate in said gaps.

9. A method of printing with liquid ink comprising:
    feeding a liquid ink from a reservoir on to a plurality of strips of hydrophilic material supported on a substrate, and controlling the flow of ink along said strips by electrostatic means.

10. A method as claimed in claim 9, each of said strips having a first portion extending from said reservoir and a second portion extending from a printing position, a narrow gap separating opposed ends of said portions and urging said ink across said gap by said electrostatic means.

* * * * *